(12) United States Patent  
Miller

(10) Patent No.: US 9,044,992 B1  
(45) Date of Patent: Jun. 2, 2015

(54) DECORATIVE CLIP ASSEMBLIES

(76) Inventor: Aleta Joy Miller, Lakewood, WA (US)

( * ) Notice: Subject to any disclaimer, the term of this patent is extended or adjusted under 35 U.S.C. 154(b) by 353 days.

(21) Appl. No.: 13/444,629

(22) Filed: Apr. 11, 2012

Related U.S. Application Data

(60) Provisional application No. 61/474,247, filed on Apr. 11, 2011.

(51) Int. Cl.
| | |
|---|---|
| *F16B 2/20* | (2006.01) |
| *F16B 2/10* | (2006.01) |
| *B42F 1/00* | (2006.01) |
| *G09F 3/16* | (2006.01) |

(52) U.S. Cl.
CPC . *B42F 1/006* (2013.01); *F16B 2/10* (2013.01); *F16B 2/20* (2013.01); *G09F 3/16* (2013.01)

(58) Field of Classification Search
CPC .............. F16B 1/20; F16B 2/20; A41F 11/02; A41F 11/04; A41F 3/02; A41F 11/16; B42F 1/006; G09F 3/16
USPC ............ 24/67.3, 67.5, 67.9, 495; 40/641, 666
See application file for complete search history.

(56) References Cited

U.S. PATENT DOCUMENTS

| | | | | |
|---|---|---|---|---|
| 3,286,381 A * | 11/1966 | Wooge | ............................ | 40/641 |
| 4,532,680 A * | 8/1985 | Hashimoto | .................... | 24/67 R |
| 4,761,862 A * | 8/1988 | Hiromori | ......................... | 24/67.9 |
| 5,249,336 A * | 10/1993 | Miller | .............................. | 24/67.5 |
| 6,327,749 B1 * | 12/2001 | Antinone | ....................... | 24/67 R |
| D479,146 S * | 9/2003 | Manley | ......................... | D11/78.1 |
| 6,732,419 B2 * | 5/2004 | Davis | ............................... | 29/450 |
| 7,318,293 B2 * | 1/2008 | Ardern, II | ....................... | 40/666 |
| 7,730,593 B1 * | 6/2010 | Juilly | .............................. | 24/67.5 |
| 8,240,010 B2 * | 8/2012 | O'Donnell | ..................... | 24/67.5 |
| 2001/0032376 A1 * | 10/2001 | Payne | ............................. | 24/67.5 |
| 2003/0084549 A1 * | 5/2003 | Davis | ............................. | 24/67 R |

\* cited by examiner

*Primary Examiner* — Robert J Sandy
(74) *Attorney, Agent, or Firm* — Baumgartner Patent Law; Marc Baumgartner

(57) ABSTRACT

Decorative clip assemblies described herein are configured to clamp onto gift bags and other items a user desires to decorate. The assemblies herein include a decorative element operably coupled to the top of a binder clip, wherein the binder clip includes folding arms that allow the clip to open and close. Advantageously sleeves are used to cover the binder clip arms to provide many advantages to the assemblies herein, non-exclusively including support, aesthetic, messaging, and protective functions.

14 Claims, 10 Drawing Sheets

DECORATIVE CLIP ASSEMBLIES

CROSS-REFERENCE TO RELATED APPLICATIONS

This application claims priority back to U.S. Provisional Application No. 61/474,247 "Decorative Clip Assemblies", filed Apr. 11, 2011, which is expressly incorporated by reference herein in its entirety.

FIELD OF THE INVENTION

The embodiments herein relate to assemblies having a decorative element operably coupled to the top of a binder clip having folding levers and methods of making the same. More specifically, the assemblies herein utilize sleeves to encase the binder clip levers which provide multiple functional advantages. Preferred uses of the clip assemblies herein are for gift bags, or other items a user desires to quickly and non-permanently decorate.

BACKGROUND

The use of a decorative element and a clip together is advantageous as it allows a user to reuse the decorative clip and can allow for easy attachment and removal. Unfortunately, prior attempts at combining clips with decorative elements include many disadvantages designs.

As a first example, U.S. Patent Publication No. 2002/0071919 to Levesque discloses a bow with a clip that is functionally disadvantageous. For example, if a user wanted to attach this assembly to a gift bag, only one side of the gift bag would show the decoration, as this clip does not allow for the bow to be presented at the top of the gift bag such that both sides can be seen. Other disadvantageous are that this assembly does not provide adequate support for a heavier style bow, the backside of the clip would not be covered by a decorative element if attached onto a gift bag, and no protective means are provided to shield the bow from being crushed.

U.S. Patent Publication, 2007/0193211 to Harrison also shows a clip and bow combination. More specifically the assemblies of Harrison allow for attachment to a gift bag and are configured to show a gift card as well. Unfortunately, Harrison is not designed to clamp the gift bag shut as the clip is adapted to hold a gift card instead. More specifically, if a user used the clamp to close the sides of the gift bag shut, the message on the card would be unreadable as it would be protruding downward into the bag. Additionally, the bow is designed to be attached to the arm of the clip and not the top of the clip thereby preventing the bow from being seen from both sides of the gift bag.

U.S. Pat. No. 5,236,725 to McCormack discloses a clip member configured to clamp onto a piece of candy, wherein the clip member includes a card and bow. The type of clip is not configured to seal gift bags as the two side members of the clip do not come together in their compressed state, apparently to prevent the candy from being crushed. (See FIG. 9, McCormack). Additionally, even if this clip could clamp onto a gift bag, the majority of the clip's sides would be seen by the viewer which is aesthetically displeasing.

Accordingly, there is a need in the art for decorative clip assemblies that can be clipped onto gift bags such that the decorative element can be viewed from more than one side of the gift bag, wherein the clip, including the clip levers, are completely or nearly completely hidden from view, the decorative element can be protected from being crushed, and adequate support is provided to heavier or expansive decorative elements, such as fold out bows.

SUMMARY OF THE INVENTION

Preferred embodiments are directed to decorative clip assemblies for releasable attachment comprising a binder clip having a top panel coupled to a first side panel and a second side panel that converge together, wherein said first and second side panels are spring-biased toward one another, and wherein the converging ends of the first and second side panels are pivotally coupled to first and second folding levers that are adapted to be moved into upward and downward positions such that when the first and second levers are in an upward position and then pressed towards each other, the converging ends of the first and second side panels separate to define a gap; a decorative element having an underside operably coupled to the top panel; and first and second sleeves that cover the first and second lever arms. Additional embodiments are directed to methods of making the decorative clip assemblies herein.

BRIEF DESCRIPTION OF THE DRAWINGS

It will be appreciated that the drawings are not necessarily to scale, with emphasis instead being placed on illustrating the various aspects and features of embodiments of the invention, in which.

DETAILED DESCRIPTION OF THE ILLUSTRATED EMBODIMENTS

Embodiments of the present invention are described below. It is, however, expressly noted that the present invention is not limited to these embodiments, but rather the intention is that modifications that are apparent to the person skilled in the art and equivalents thereof are also included.

Figure 1:
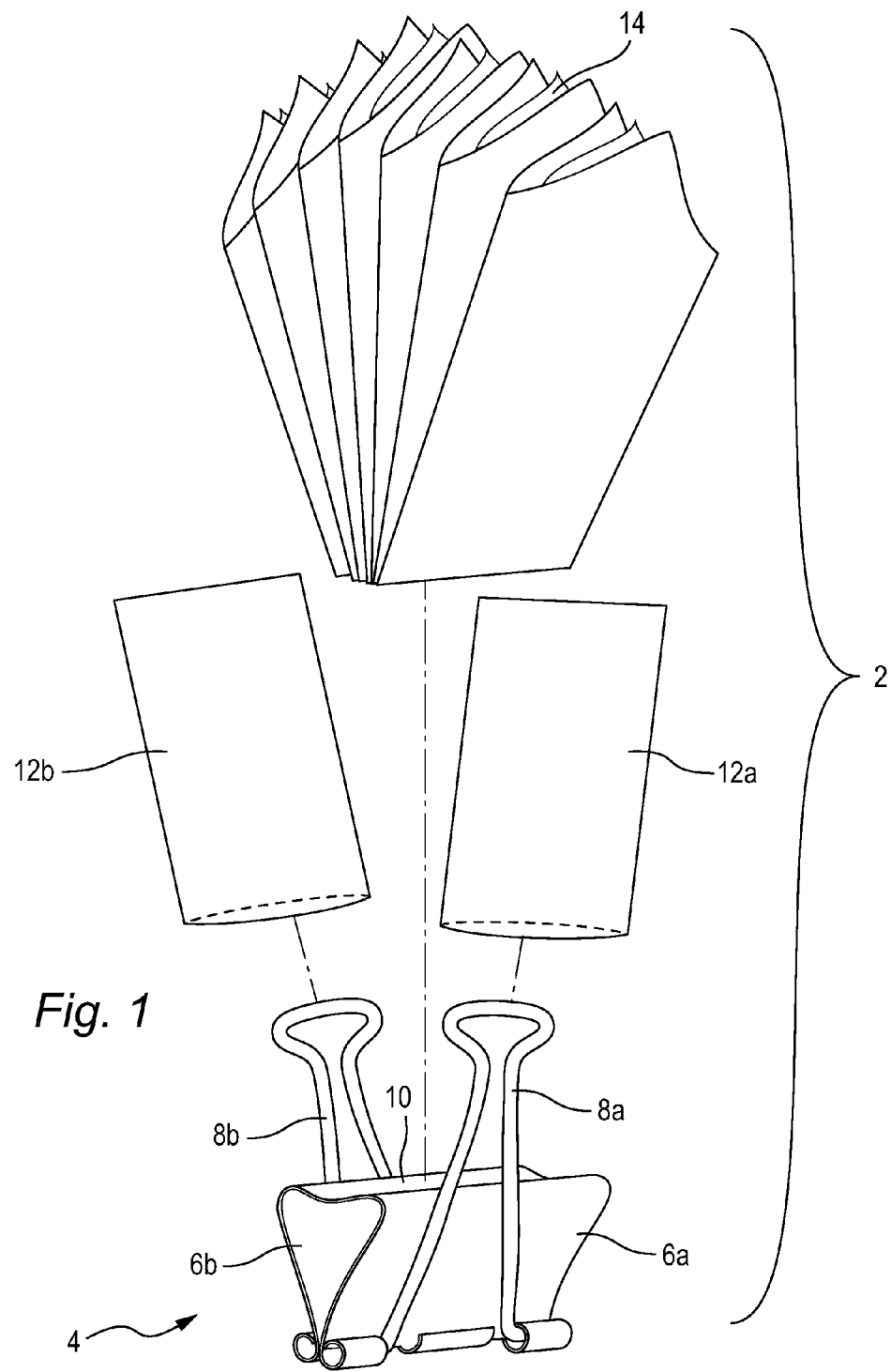
FIG. 1 is an exploded view of a decorative clip assembly.
Figure 2:
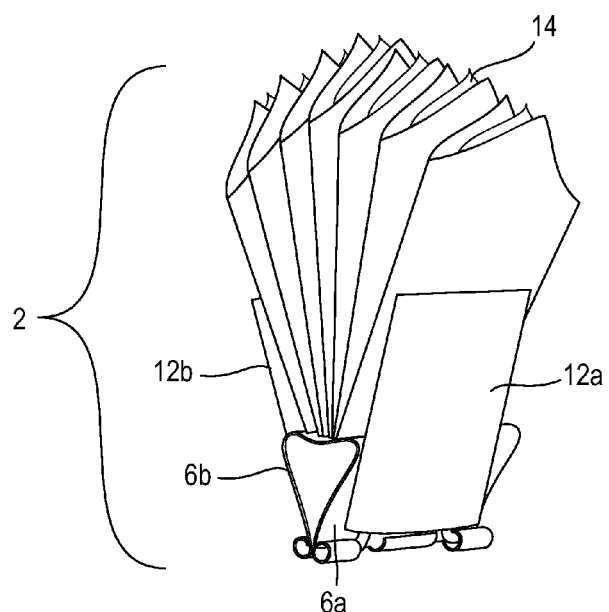
FIG. 2 is a perspective view of a decorative clip with an expanding bow in a folded position.
Figure 3:
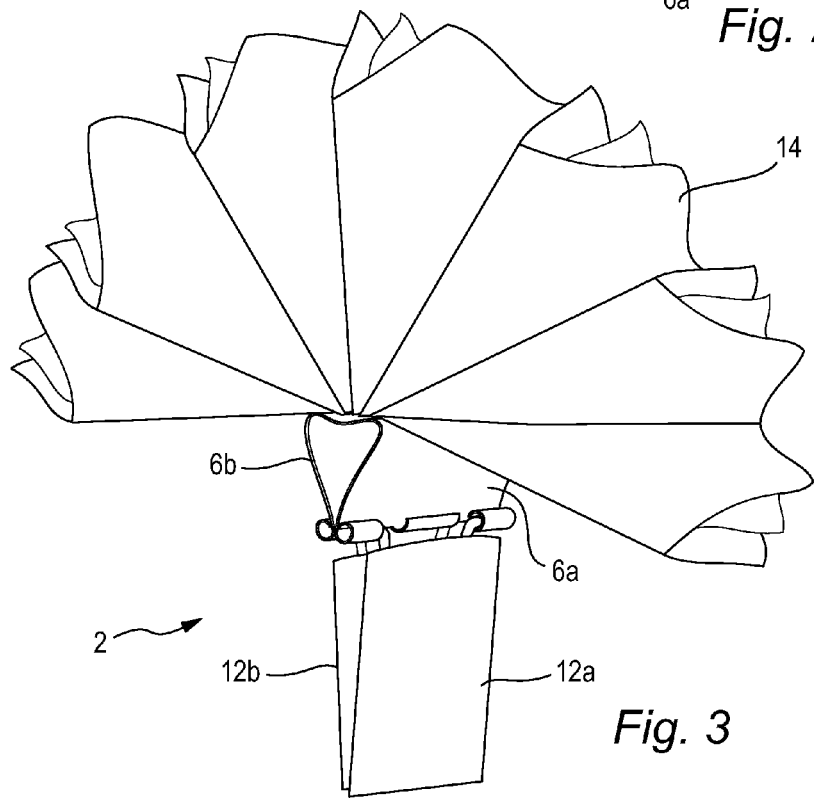
FIG. 3 is a perspective view of a decorative clip assembly with an expanding bow in a partially expanded position.
Figure 4:
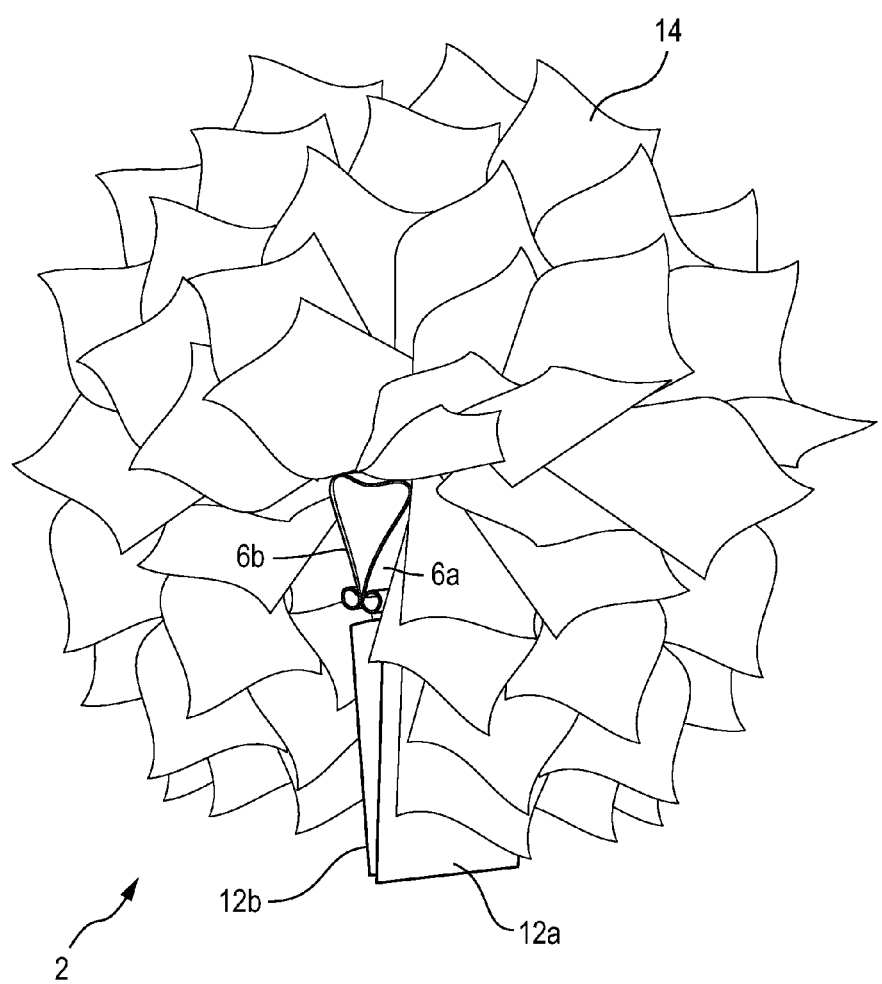
FIG. 4 is a perspective view of a decorative clip assembly clamped with an expanding bow in a fully expanded position.

FIG. 1 shows an exploded decorative clip assembly 2 configured to clamp on a desired object such as a gift bag. FIGS. 2-4 show preferred decorative clip assemblies 2 in various configurations. As depicted in these figures the assembly 2 includes a binder clip 4, two sleeves 12a and 12b and a decorative element 14.

Binder clips are also known as banker's clips or foldover clips. Preferred binder clips 4 to be used with the teachings herein are commercially available binder clips, although custom or unique shaped binder clips can be used as well. Depending on the decorative goals and size of the decorative element 14, small, medium, large, or extra large sizes of commercially available binder clips can be used with the assemblies 2 herein. Preferably, the top panel 10 of the clip can be approximately between 0.5 mm to 5 cm in width.

In general, the binder clip 4 includes a top panel 10 having ends coupled to a first side panel 6a and a second side panel 6b that converge together, wherein the side panels 6a and 6b are spring-biased toward one another. Additionally, the converging ends of the side panels 6a and 6b are pivotally coupled to first and second folding levers 8a and 8b that are adapted to be moved into upward and downward positions. FIGS. 1 and 2 show the levers 8a and 8b in an upward position and FIG. 3 shows the levers 8a and 8b in a downward position. More specifically, when the first and second levers 8a and 8b are in an upward position and then pressed towards each other, the converging ends of the first and second side panels 6a and 6b separate to define a gap thereby allowing the clip 4 to clamp onto a desired object to provide a decorative effect.

Binder clips having pivoting levers 8a and 8b that allow the side panels 6a and 6b to open and close for releasable attachment are well known in the art, and any suitable binder clip can be used with the teachings herein. Examples of suitable binder clips that can be used with the assemblies 2 herein non-exclusively include those disclosed in U.S. Pat. Nos. 1,139,627 and 1,865,453 to Baltzley. Both of these references are expressly incorporated by reference in their entireties. A preferred material for ease of manufacturing and to allow for resiliency of the side panels 6a and 6b is sheet metal, but other suitable materials could be used as well. The sheet metal can be stainless steel and finished in nickel, silver or gold. The sheet steel is preferably black oxide coated.

Figure 12:
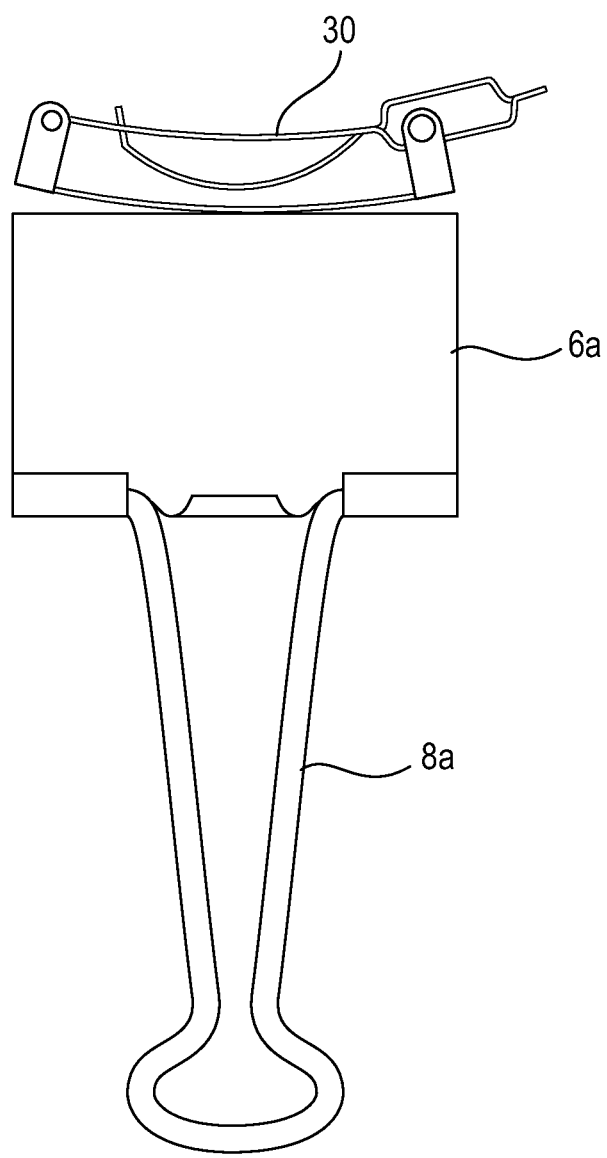
FIG. 12 is a perspective view of a binder clip assembly utilizing a top clip to allow coupling to a decorative element.
Figure 13:
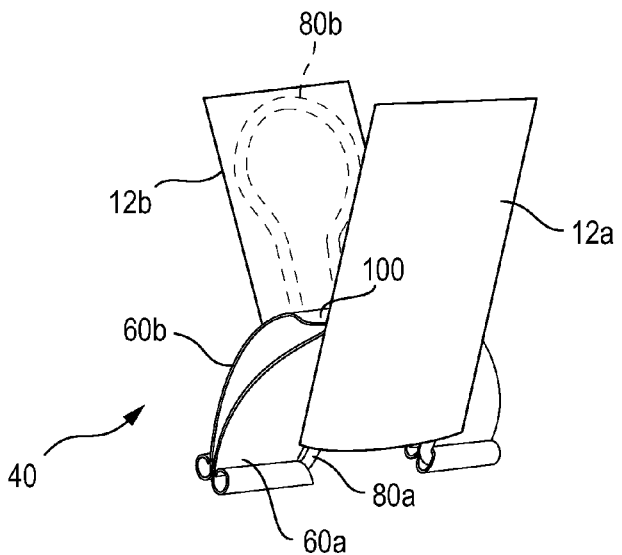
FIG. 13 is a perspective view of an alternative binder clip with the levers in an upward position.
Figure 14:
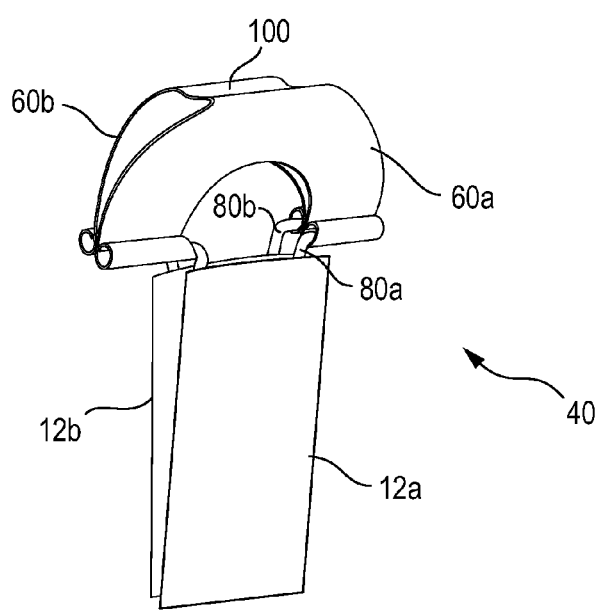
FIG. 14 is a perspective view of an alternative binder clip with the levers in a downward position.

FIGS. 13 and 14 show a preferred commercially available binder clip 40 that has a top panel 100 and side panels 60a and 60b in the shape of arcs, instead of rectangles as shown in more conventional binder clips, such as in FIG. 1. These binder clips 40 have pivoting levers 80a and 80b and function similarly to and can be expressly interchangeable with the more conventional binder clips 4 shown in FIGS. 1-12 for all embodiments described herein. Preferred arc shaped binder clips 40 are commercially available from Office Max and are sold under the name OFFICEMAX COLOR C-CLIPS.

The first and second levers 8a and 8b are preferably made of stiff wire and are held at a pivot point near the converging ends of the first and second side panels 6a and 6b. As one example, the converging ends of the first and second side panels 6a and 6b can be curled outward to form loops that hold the bottom ends of the levers 8a and 8b to allow for pivoting. Two slots can be cut into each loop and shaped to allow the first and second levers 8a and 8b to be folded downward when the clip 4 is closed. When the levers 8a and 8b are positioned in an upward position they are held in place by the junction of the top panel 10 with the respective side panel 6a and 6b. The first and second levers 8a and 8b are preferably configured to operate independently of each other such that the first lever 8a can be positioned upwards while the second lever 8b can be positioned downward and vice versa. Preferred hinged levers 8a and 8b can be any suitable shape but are preferably configured in a loop, as conventional binder clip levers are shaped. The levers 8a and 8b are preferably nickel plated. Non-preferred materials for the levers 8a and 8b includes hard plastic, such as thermoplastics.

The use of binder clips 4 with the assemblies 2 herein allow for quick releasable attachment to the target object to be decorated, such as a gift bag 16. Releasable attachment is advantageous as it allows for the decorative assemblies 2 to be reusable.

The decorative element 14 can be any suitable type of decoration, but is preferably a type of bow. Likewise the decorative element 14 can be attached to the top panel 10 of the binder clip 4 using any suitable means for releasable or non-releasable attachment depending on the type of decorative element 14 used. Non-exclusive types of decorative elements 14 that can be coupled to the binder clips 4 herein include ribbon bows such as those made of satin, or organza ribbon, curly ribbon bows, felt bows, raffia bows made of twine or natural materials, ribbon tie bows, tissue paper, artificial flowers and plants, jewelry, beads, expanding bows, and pull bow ribbons. For pull bow ribbons, where one or more strings are pulled to form the bow, one or more sleeves 12a and 12b can include a cleat or small peg to wrap the string around.

According to preferred embodiments, the teachings herein can utilize expanding bows as the decorative element 14. According to more specific embodiments, an expanding bow can be used that when folded has a width that is less than the width of the top panel 10 of the binder clip 14 and when expanded has a width of at least twice, three times, or four times greater than the width of the top panel 10 of the binder clip 14. FIGS. 2-4 show an exemplary expandable bow as the decorative element 14. In FIG. 2, the bow 14 is in a folded state and the sleeves 12a and 12b are in an upward position which can prevent the premature or inadvertent expansion of the bow 14 and also protect the bow 14. In FIG. 3, the sleeves 12a and 12b and internal levers 8a and 8b are moved to a downward position thereby allowing the bow 14 to expand. In FIG. 3, the bow 14 is in a partially expanded state, while FIG. 4 shows the bow 14 in a fully expanded state. According to the embodiment depicted in FIG. 4, the fully expanded bow 14 covers all, or nearly all, of the sleeves 12a and 12b and the binder clip 4 to prevent them from being seen by a user. This particular embodiment is advantageous for embodiments where the sleeves 12a and 12b are not configured to display a greeting or message to the receiver. While not shown in FIG. 3, it is desirable to have the user first clamp the binder clip 4 onto the targeted item (e.g., gift bag, gift basket) before expanding the bow 14.

Figure 6:
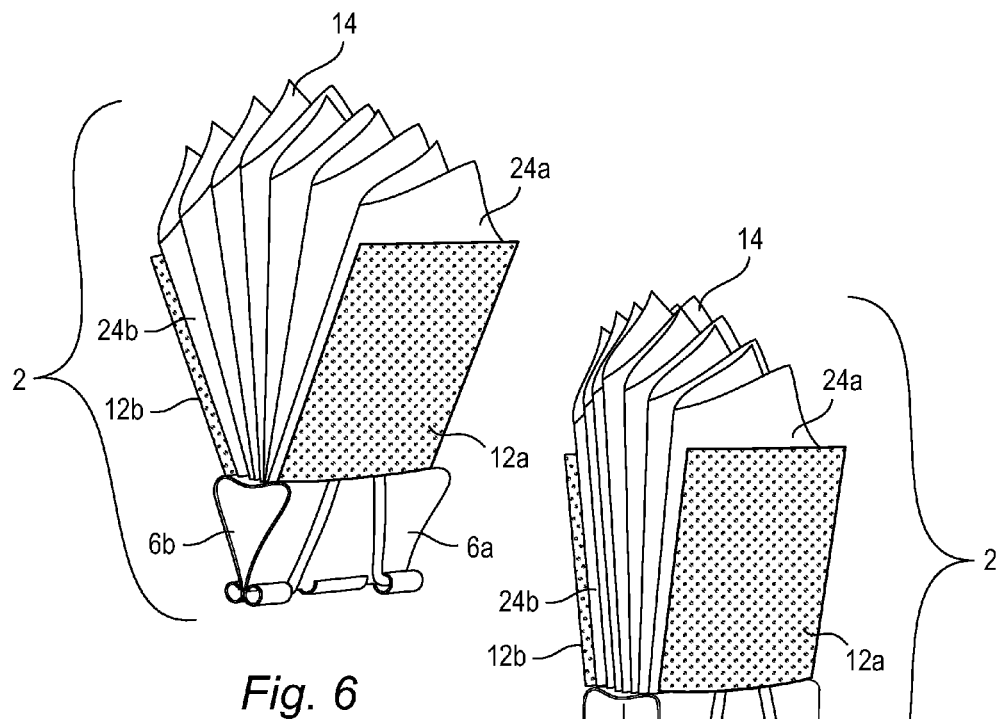
FIG. 6 is a perspective view of a decorative clip assembly with an expanding bow in a folded position and attached to the sleeves.
Figure 7:
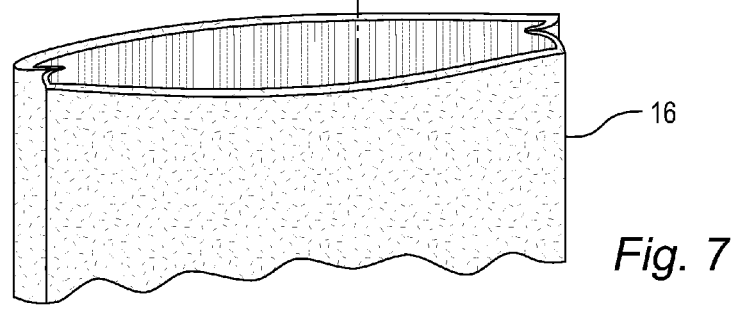
FIG. 7 is a perspective view of a decorative clip assembly in an open position with an expanding bow compressed and attached to the sleeves.
Figure 8:
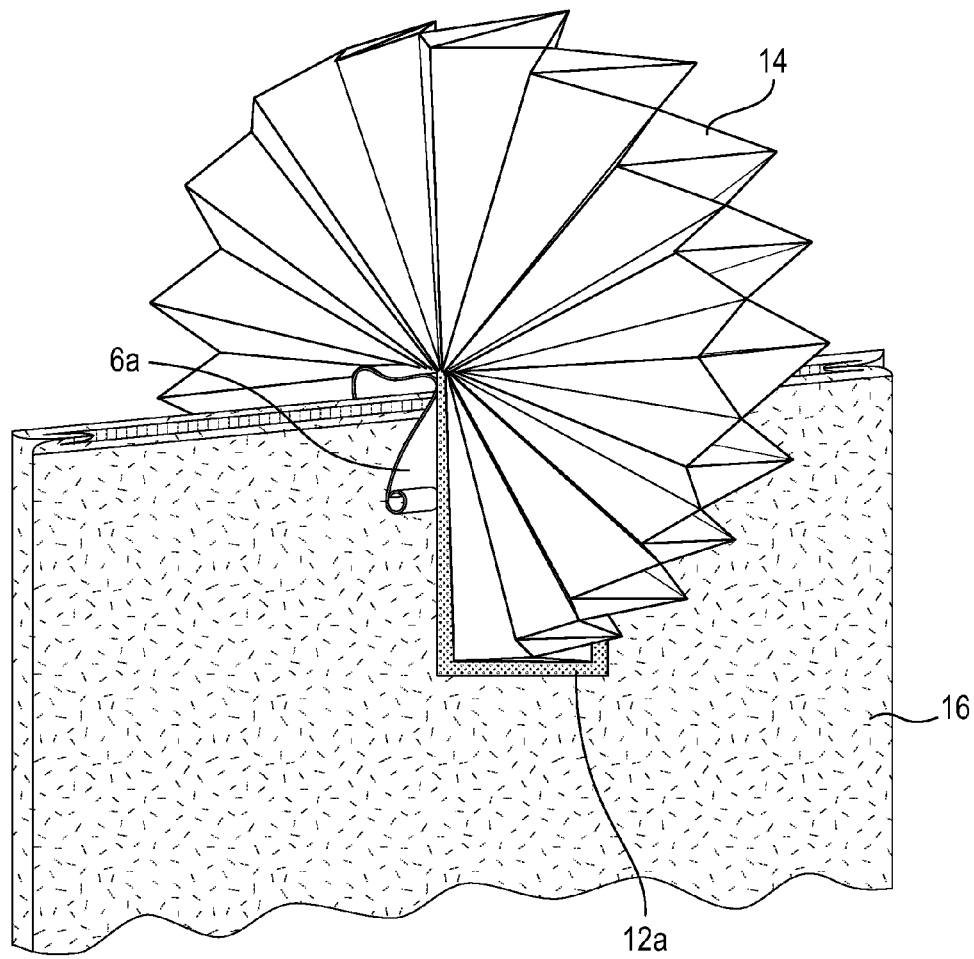
FIG. 8 is a perspective view of a decorative clip assembly clamped onto a gift bag with a fully expanded bow attached to the sleeves.

The above-mentioned step is more fully detailed in FIGS. 6-8 which depict embodiments wherein the decorative element 14 is expandable and includes first and second ends 24a and 24b attached to the inner faces of the sleeves 12a and 12b. The first and second ends 24a and 24b can be coupled to the sleeves 12a and 12b using any suitable releasable or non-releasable means, such as adhesives, glues, and hook and loop fasteners such as VELCRO™, and the like, for example. In FIG. 6 the jaws of the binder clip are closed and the sleeves 12a and 12b are positioned in an upward positioned and coupled to the ends 24a and 24b of the expandable bow 14. In FIG. 7, the sleeves 12a and 12b are compressed towards each other, thereby causing the side panels 6a and 6b to separate from each other to form a gap to allow clamping onto a targeted item, such as the top of a gift bag 16. According to preferred embodiments, it is preferred that the decorative element 14 has elasticity or resiliency such that it can compress further than its natural folded state (as shown in FIG. 6) when the sleeves 12*a* and 12*b* are pressed towards each other as shown in FIG. 7. Once the decorative clip assembly 2 is clamped onto the gift bag 16, the sleeves 12*a* and 21*b* can be moved to a downward position so that the decorative element 14 can be expanded into its final position, which can be fully covering, or nearly fully covering of the sleeves 12*a* and 12*b* or allowing the sleeves 12*a* and 12*b* to be seen, such as when they are designed to convey a message to a receiver.

Figure 9A:
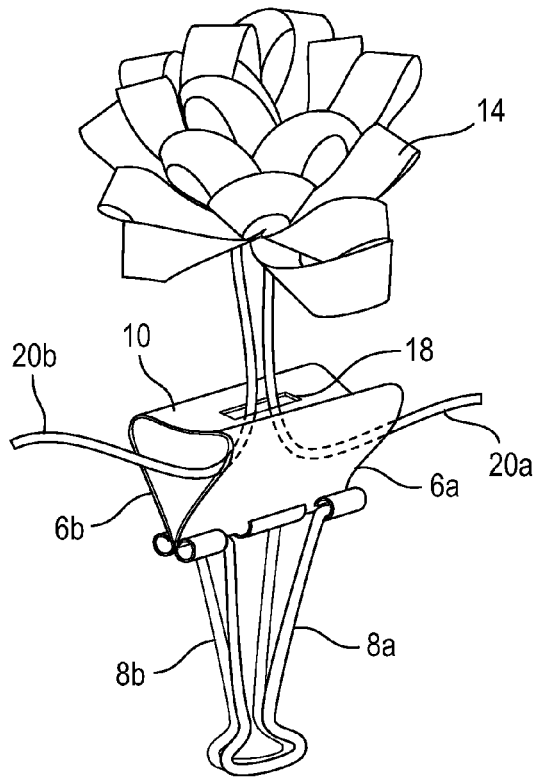
FIG. 9a is a perspective view of a bow being tied through a slot in a binder clip.
Figure 9B:
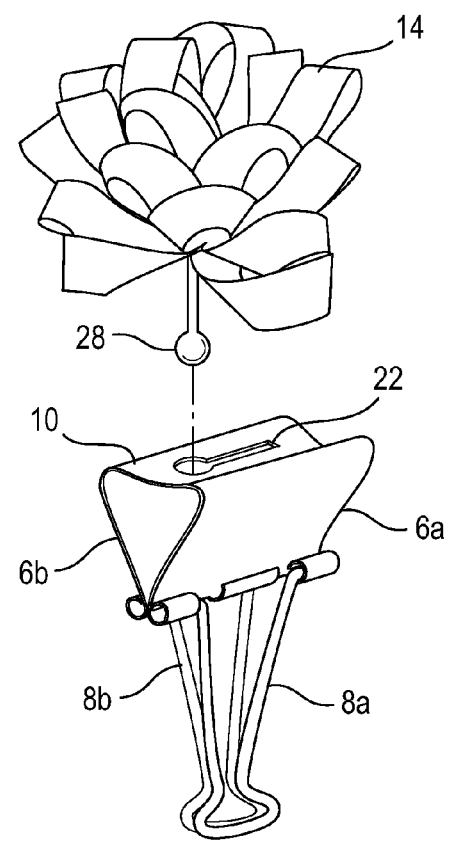
FIG. 9b is a perspective view of bow being anchored to a keyhole shaped slot in a binder clip.

The underside of the decorative element 14 can be attached to the topside 10 of the binder clip 4 using any suitable methods, including adhesives, glue, hook and loop fasteners such as VELCRO™, snaps, or the use of ties for example. The decorative element 14 can be attached through means through the channel created by the inner faces of the side panels 6*a* and 6*b* as well. As shown in FIG. 12, additional embodiments for releasably attaching the decorative element 14 can include the use of a clip such as a hair clip style clip 30 that is secured onto the top of the binder clip 4 such as by glue or an adhesive. The clip 30 can readily and releasably clamp to the underside of the decorative element 14. Releasable attachment means are advantageous to allow a user to quickly remove or change decorative elements 14 if so desired. Additional releasable attachment means can include an aperture or slot created in the top panel 10 of the of the binder clip 4. FIG. 9A shows a slot 18 that can accommodate releasable fasteners such as first and second string ties 20*a* and 20*b* that can be passed through said slot 18 and tied to secure the decorative element 14 to the binder clip 4. FIG. 9B shows a keyhole shaped slot 22 having a large aperture connected to a narrower slot. An anchor 28 on the underside of the decorative element 14 can pass through the large aperture and then be slid over to the narrower slot to prevent removal should someone pull upward on the decorative element 14. According to alternative embodiments, more than one slot can be created into the binder clip 4. Slots such as 18 and 22 can be made using any suitable technique such as machining, cutting, or the use of lasers. The use of slots 18 and 22 was discovered to allow the decorative element 14 to expand fuller due to the secure attachment of the decorative element 14 to the binder clip 4.

Figure 5:
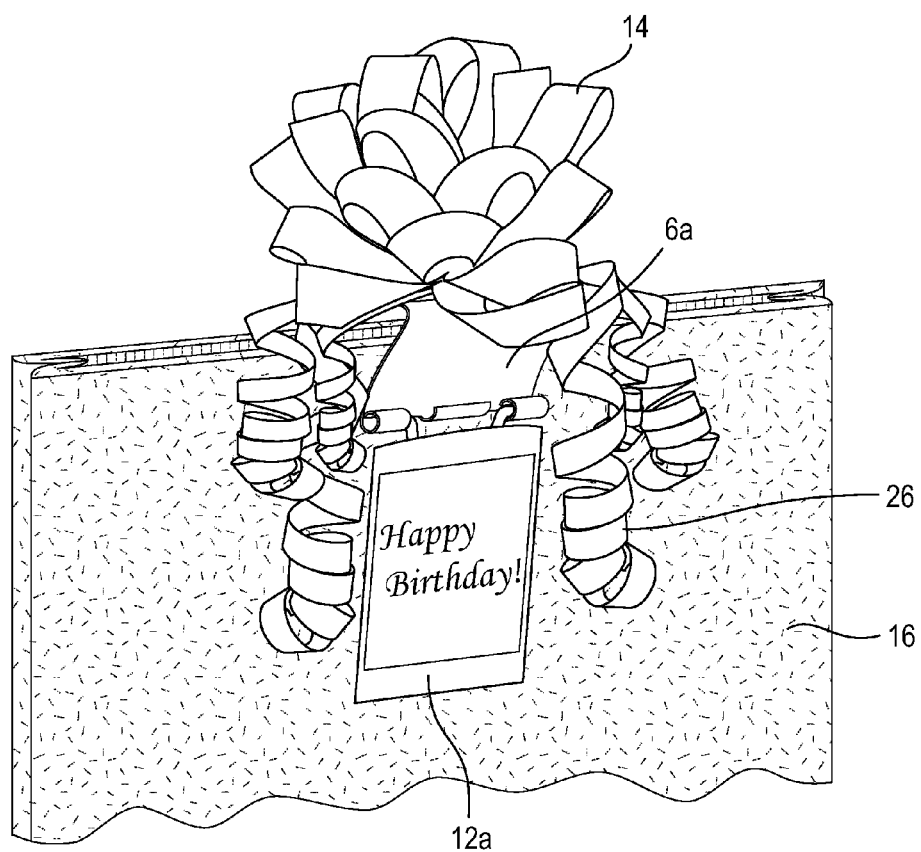
FIG. 5 is a perspective view of a decorative clip assembly clamped onto a gift bag with a sleeve utilized to convey a message.

Supplemental decorative elements can also be used with the primary decorative element 14 and can include any suitable material, such as those described above for the primary decorative element 14. As one example, and as shown in FIG. 5, curly ribbon 26 can be attached to the decorative clip assembly to enhance the effect of the primary decorative element 14. Supplemental decorative elements can be attached using the same means as discussed above for the primary decorative element 14.

According to preferred embodiments, the decorative clip assemblies 2 described herein include sleeves 12*a* and 12*b* that cover the levers 8*a* and 8*b* of the binder clips 4. The sleeves 12*a* and 12*b* can be constructed out of a variety of types of materials including construction paper, cardboard, thermoplastics, paper, laminate, matboard, and the like. According to preferred embodiments, the material of the sleeves 12*a* and 12*b* is not overly rigid or heavy such as a metal or hard thermoplastic. This could add too much weight to the assembly 2 and cause it to tilt or topple over on the gift bag 16 or whatever item it is clamped to. Instead, it is preferred that the sleeves 12*a* and 12*b* are made of a material that is lightweight and has some pliancy. According to non-preferred embodiments the material of the sleeves can be rigid, such as a thermoplastic. The sleeves 12*a* and 12*b* can additionally be laminated, polycoated, and/or covered in decorative material such as fabric, gift wrap, felt, jewelry, paint, ink. Sleeves 12*a* and 12*b* can be applied to their respective levers 8*a* and 8*b* in a variety of ways. As one example, two pieces of thin plastic can be heated and applied to both sides of a lever 8*a*. When cooled, a thin plastic sleeve 12*a* will form and cover the lever 8*a*. Additionally, the sleeve 12*a* can be a pocket, as shown in FIG. 1. The pocket can be filled with glue or adhesive and slid onto the desired lever 8*a* and allowed to dry or stick. According to further embodiments, the sleeve 12*a* can be a strip of material having an adhesive or glue on the backside that is folded over onto the lever 8*a*.

Many unexpected advantages of utilizing sleeves 12*a* and 12*b* were discovered in the development of the decorative clip assemblies 2 herein. As a first advantage, the sleeves 12*a* and 12*b* provide support for the binder clip 4 and the decorative element 14 when the assembly 2 is clamped onto a desired object. In many conditions, the weight of a metal binder clip 4 and a large decorative element 14 can cause the assembly to topple over or otherwise tilt without the use of sleeves 12*a* and 12*b*. An additional advantage is that the sleeves 12*a* and 12*b* are easier for a user to find under a decorative element 14, thereby allowing easier removal of the decorative clip assembly 2. In a related manner, the sleeves 12*a* and 12*b* offer more surface area than traditional wire loop levers 8*a* and 8*b* and thus make it easier for a user to compress the levers 8*a* and 8*b* to open the jaws of the binder clip 4 and to move the levers 8*a* and 8*b* between upward and downward positions.

Still, another advantage of the sleeves 12*a* and 12*b* described herein is that they can be attached to the sides of an expanding bow, as shown in FIGS. 6-8 which, as described above, depict embodiments wherein the decorative element 14 is expandable and includes first and second ends 24*a* and 24*b* attached to the inner faces of the sleeves 12*a* and 12*b*. This particular embodiment is advantageous as the sleeves 12*a* and 12*b* allow for a controlled expansion of the bow 14 and help to allow for a guided refolding of the bow 14 after being used. The sleeves 12*a* and 12*b* also prevent the bow 14 from inadvertently unfolding or expanding when not in use. In a related manner, sleeves 12*a* and 12*b*, whether attached to the decorative element 14 or not, can serve to protect the decorative element 14 when the levers 8*a* and 8*b* are positioned in an upright position, see FIGS. 2 and 6, for example. It is noted that FIGS. 2 and 6 are merely exemplary as the decorative element 14 can be made to be shorter or the sleeves 12*a* and 12*b* can be made longer to offer more protection of the decorative element 14. According to preferred embodiments, the sleeves 12*a* and 12*b* are the same height or higher as the folded decorative element 14 when the levers 8*a* and 8*b* are placed in an upright position.

Still additional advantages of the sleeves 12*a* and 12*b* are that they can convey messages. Messages can be conveyed on one or both outer faces of the sleeves 12*a* and 12*b* and in certain embodiments on one or more of the inner faces of the sleeves 12*a* and 12*b*. FIG. 5 shows an example of one or more of the sleeves 12*a* and 12*b* being used to convey a message or serve as an identifier. Message conveying, such as a birthday wish, holiday greeting, get well note, and the like, can be done in a number of suitable ways. As one example, a user can simply write the message or identifying information directly on the sleeve 12*a*. This can be done with a permanent writing tool, such as a pen. Alternatively, the sleeve 12 can be made of or coated with a material such as a plastic (e.g., melamine or cellulose acetate) that allows for non-permanent writing such as dry-erase markers. According to these embodiments, it is not desirable to use an expanding decorative element 14, or if the decorative element 14 is expandable it does not cover the sleeves 12a and 12b in its expanded state, as this would prevent the message or identifying information from being presentable to a reader. Alternatively, the sleeves 12a and 12b can include a transparent pocket (e.g., plastic) that allows for the insertion of a greeting note, business card, gift card, picture, and the like. For this embodiment, pocket can be created by sealing or laminating two or three sides of a transparent sheet onto the outer face of the sleeves 12a and 12b. Preferably one or two of the horizontal sides of the pocket is unattached to the sleeve 12a to allow insertion of a thin gift, picture, or message conveying article. Alternatively, the top side of the pocket can be unattached to allow for top insertion. According to other embodiments, pockets can be attached to the inner faces of the sleeves 12a and 12b as well. According to further embodiments, the sleeves 12a and 12b can themselves be pockets such that two sheets are melted together on both the inner and outer sides of one or more levers 8a and 8b with either a side or top entry for insertion and removal of a gift, picture, or message conveying article. Additionally, non-transparent (e.g., fabric, cloth, non-transparent plastic) and merely decorative pockets can be attached to the sleeves 12a and 12b such as to surprise the receiver such as if a gift card were enclosed.

An additional advantage of the sleeves 12a and 12b is that they allow the decorative clip assembly 2 to stand upright without clamping onto a desired object, such as a gift bag 16. For example, the sleeves 12a and 12b can be positioned in a downward position as shown in FIG. 3, and then separated such that they diverge from each other and the angle between the first and second sleeve 12a and 12b is between 90 and 10 degrees and they form a downward "V" shape. This downward V configuration allows the sleeves 12a and 12b to act as a load bearing stand that supports the binder clip 4 and the decorative element 14. It should be noted that without the sleeves 12a and 12b, the levers 8a and 8b of a binder clip 4 will not stay in a downward V configuration. Thus the sleeves 12a and 12b provide another advantage in allowing the decorative assembly 2 to be self standing and decorative in addition to allowing for clamping onto other objects.

It is preferred that the levers 8a and 8b are entirely or substantially entirely covered by their respective sleeves 12a and 12b. According to certain embodiments more than 80% or 90% of the surface area of the levers 8a and 8b are covered by the sleeves 12a and 12b. For embodiments where the sleeve 12a and 12b covers less than the entire surface area of the levers 8a and 8b it is preferred that the decorative element 14 is configured to cover the exposed portion of the levers 8a and 8b. For example in FIG. 11 where approximately 80% of the lever 8a is covered by the sleeve 12a, it is preferred that a decorative element 14, such as a bow would cover the gap between the top of the sleeve 12a and the bottom of the side panel 6a, when in use.

Figure 10:
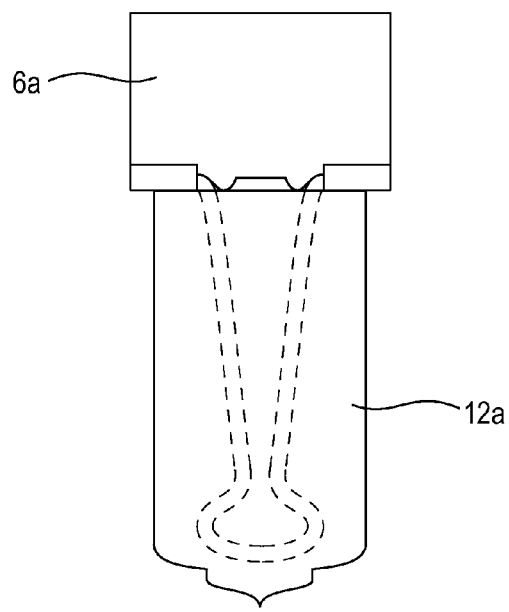
FIG. 10 is a perspective view of a binder clip having a stylized sleeve.
Figure 11:
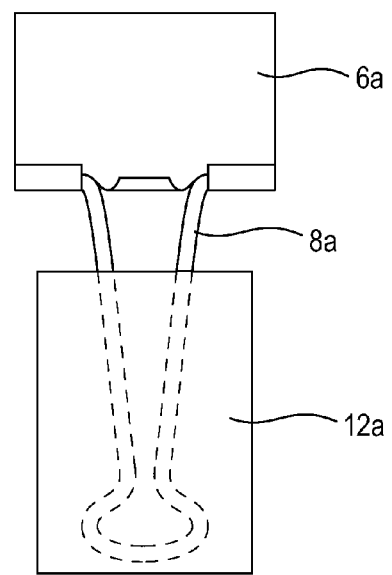
FIG. 11 is a perspective view of a binder clip having a sleeve partially covering a clip lever.

Preferred sleeves 12a and 12b are substantially rectangular in shape such that the length (longer side) is vertically oriented and the width (shorter side) is horizontally oriented, as shown in FIG. 1. More specifically it is preferred that the sleeves 12a and 12b have a width that is equivalent to, or substantially equivalent to, the width of the side panels 6a and 6b of the binder clip 4. According to even more specific embodiments, the sleeves 12a and 12b have widths within 1 or 2 cm of the width of the side panels 6a and 6b. Preferably the length of the sleeves 12a and 12b is slightly longer than the levers 8a and 8b such that the bottom ends are covered. According to even more preferred embodiments, the sleeves can be within 1 or 2 cm of the length of the levers 8a and 8b. Alternative embodiments are directed to one or more sleeves having a vertically oriented width and horizontally oriented length. Having this configuration is particularly advantageous for displaying gift cards, business cards, and the like. Thus the sleeves 12a and 12b can include one or more pockets that are sized for standard gift cards or business cards, for example. While most embodiments described herein are directed to rectangular shaped, or substantially so, sleeves 12a and 12b, the sleeves provided herein can be other shapes as well according to non-preferred embodiments, such as squares, circles, triangles, ovals, and the like. FIG. 10 shows the bottom edge of a sleeve 12a with a decorative profile, as another example.

FIGS. 5-8 show a preferred use for the decorative clip assemblies 2 described herein which is to releasably close gift bags 16 in an aesthetically pleasing manner. The assembly 2 simultaneously prevents the bag 16 from inadvertently being opened and provides decoration. This particular use is expressly non-limiting as the assemblies provided herein can be used to releasably attach to numerous other items for decorative purposes. Non-exclusive examples of other items the assemblies 2 herein can be used to decorate include wrapped presents (by clipping onto ribbon for example), gift baskets, holidays items like Christmas trees, and garlands, vases, bouquets, place settings for guests, centerpieces, clothing such as hats, pants, and shirts, and the like. According to certain embodiments, the assemblies 2 herein do not need to clamp onto an item but can be functional otherwise. For example, for a place setting use, the sleeves 12a and 12b and enclosed levers 8a and 8b can function as a load bearing support for the binder clip 4 and the decorative element 14. For this embodiment, the sleeves 12a and 12b can be angled downward such as to form an upside-down "V" wherein the angles between the two sleeves 12a and 12b is less than 90 degrees and greater than 10 degrees. When used as a place setting, one or more of the sleeves 12a and 12b can include identifying information such as a guest's name.

All patent documents listed herein are expressly incorporated by reference in their entireties. The invention may be embodied in other specific forms besides and beyond those described herein. The foregoing embodiments are therefore to be considered in all respects illustrative rather than limiting, and the scope of the invention is defined and limited only by the appended claims and their equivalents, rather than by the foregoing description.

The invention claimed is:

1. A decorative clip assembly for releasable attachment comprising:
    a binder clip having a top panel coupled to a first side panel and a second side panel that converge together, wherein said first and second side panels are spring-biased toward one another, and wherein the converging ends of the first and second side panels are pivotally coupled to first and second folding levers that are adapted to be moved into upward and downward positions such that when the first and second levers are in an upward position and then pressed towards each other, the converging ends of the first and second side panels separate to define a gap;
    a decorative element having an underside operably coupled to the top panel wherein the decorative element is an expandable bow that can be folded into a contracted position and unfolded to an expanded position; and
    first and second sleeves that cover the first and second lever arms.

2. The decorative clip assembly of claim 1, wherein the expandable bow has a width that is smaller than the width of the top panel of the binder clip and a width that is greater than two times the width of the top panel in the expanded position.

3. The decorative clip assembly of claim 1, wherein the bow has resiliency in its contracted state such that it can withstand the compression of the first and second sleeves when a user is opening the binder clip.

4. The decorative clip assembly of claim 1, wherein the first and second sleeves are coupled to first and second sides of the expanding bow, and thereby allow for controlled unfolding of the bow when the sleeves are moved to a downward position and controlled folding of the bow when the sleeves are moved to an upward position.

5. The decorative clip assembly of claim 1, wherein the first and second sleeves cover the entire surface areas of the levers, or substantially so.

6. The decorative clip assembly of claim 1, wherein the first and second sleeves are pliable.

7. The decorative clip assembly of claim 1, wherein the first and second sleeves are configured to act as load bearing support for the binder clip and decorative element when positioned in a downward V shape on a level, or substantially level surface.

8. The decorative clip assembly of claim 1, wherein the first and second sleeves are substantially the same height or higher than the decorative element when the sleeves are moved into the upper position.

9. The decorative clip assembly of claim 1, wherein at least one of the first and second sleeves are made of or are coated with a material that allows for non-permanent writing with a dry-erase marker.

10. The decorative clip assembly of claim 1, wherein the topside of the top panel includes a releasable clip for attaching the decorative element.

11. The decorative clip assembly of claim 1, wherein the first and second side panels are in the shape of arcs.

12. A decorative clip assembly for releasable attachment comprising:
   a binder clip having a top panel coupled to a first side panel and a second side panel that converge together, wherein said first and second side panels are spring-biased toward one another, and wherein the converging ends of the first and second side panels are pivotally coupled to first and second folding levers that are adapted to be moved into upward and downward positions such that when the first and second levers are in an upward position and then pressed towards each other, the converging ends of the first and second side panels separate to define a gap;
   a decorative element having an underside operably coupled to the top panel;
   first and second sleeves that cover the first and second lever arms; and
   wherein the top panel of the binder clip includes one or more slots.

13. The decorative clip assembly of claim 12, wherein the one or more slots is in the shape of a keyhole, where a larger aperture is coupled to a thinner aperture.

14. A decorative clip assembly for releasable attachment comprising:
   a binder clip having a top panel coupled to a first side panel and a second side panel that converge together, wherein said first and second side panels are spring-biased toward one another, and wherein the converging ends of the first and second side panels are pivotally coupled to first and second folding levers that are adapted to be moved into upward and downward positions such that when the first and second levers are in an upward position and then pressed towards each other, the converging ends of the first and second side panels separate to define a gap;
   a decorative element having an underside operably coupled to the top panel; and
   first and second sleeves that cover the first and second lever arms; and
   wherein at least one of the first and second sleeves contains a transparent pocket for insertion of a thin item.

* * * * *